UNITED STATES PATENT OFFICE.

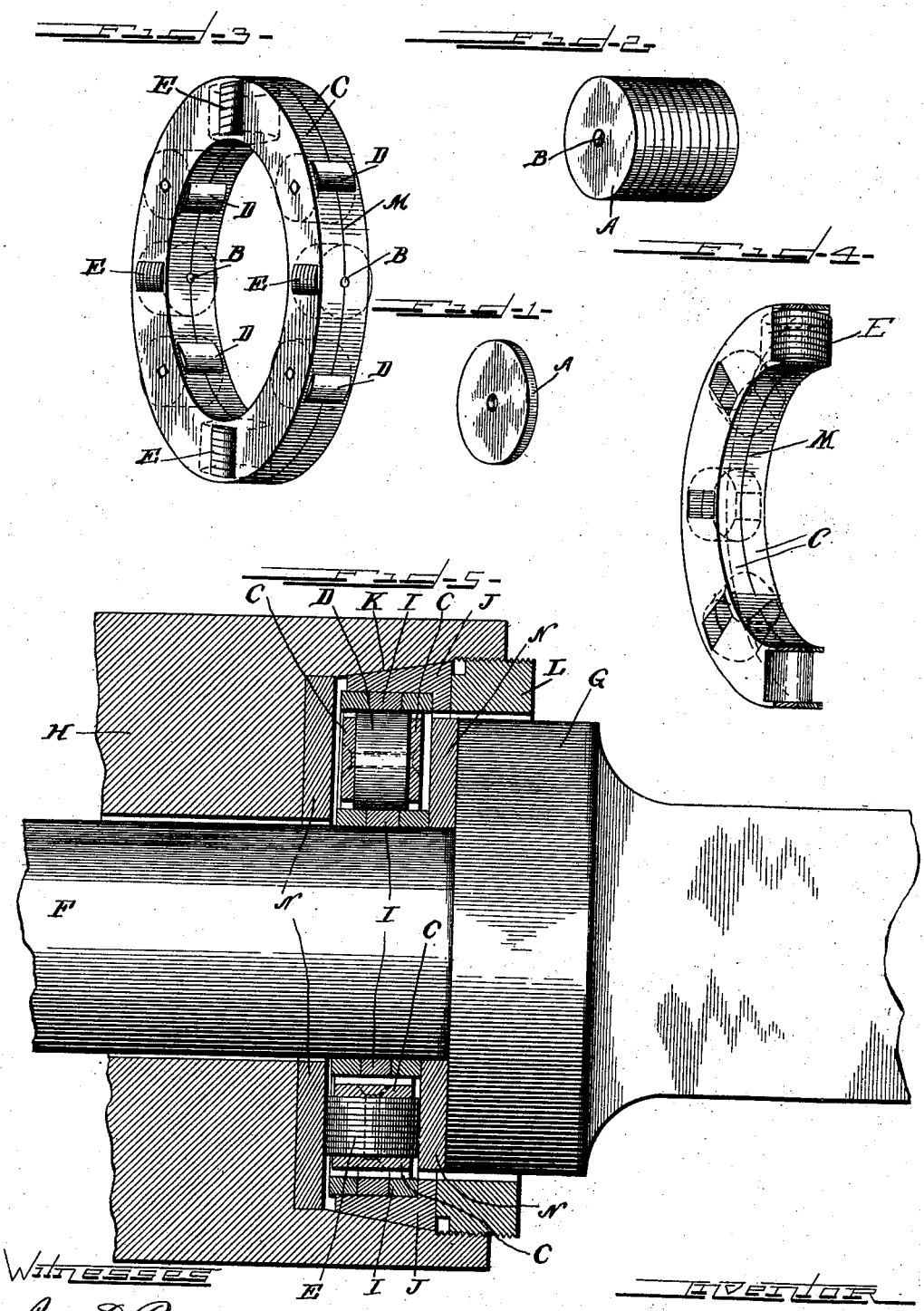

FRANK WHITNEY, OF WINNETKA, ILLINOIS.

ROLLER-BEARING.

SPECIFICATION forming part of Letters Patent No. 690,626, dated January 7, 1902.

Application filed July 30, 1900. Serial No. 25,283. (No model.)

*To all whom it may concern:*

Be it known that I, FRANK WHITNEY, a citizen of the United States, residing at Winnetka, in the county of Cook and State of Illinois, have invented new and useful Improvements in Roller-Bearings, of which the following is a specification.

My invention relates to roller-bearings; and one of the objects of my improvement is to furnish rollers with a greater amount of contact-surface than balls occupying the same space that will roll practically as free as balls in bearings where said rollers are compelled to follow a circular path with their axes radiating from a common center. There are other advantages, hereinafter described. I attain these objects by the mechanisms illustrated in the accompanying drawings.

Figure 1 represents a disk of any desirable material. Fig. 2 represents a composite roll composed of a series of disks. Said disks may be retained in the form of a roller by a rod through their centers or by a cage or any other suitable means. Fig. 3 represents a cage or frame containing rolls arranged at right angles to each other. Fig. 4 is a section of cage, similar in outline to Fig. 3, containing one of a series of the composite rolls arranged radially on a circle. Fig. 5 represents a roller-bearing showing the application of cage Fig. 3, where the two series of rollers in one line of travel are supporting loads at right angles to each other.

Similar letters refer to similar parts throughout the several views.

A indicates a single disk.

B indicates a rod for holding the disks together in a roller form.

C indicates two parts of a cage for holding a series of rolls at right angles to each other.

D indicates a solid roller.

E indicates a roller similar to that in Fig. 2.

F indicates a piece of shafting.

G indicates a collar on shafting for end thrust.

H indicates the outer casing.

I indicates a spirally-wound wire casing for rollers to run on.

J indicates a wedge-shaped ring.

K indicates the angles of an annular wedge in the outer casing.

L indicates a nut for jamming the wedge J against the wedge K for the purpose of lateral expansion.

M indicates a dividing-line of cage C.

N indicates a steel washer.

My object in using a roller composed of a series of disks is to facilitate the rolling of a parallel cylinder around a circular path, as when the axis of said cylinder is at right angles to the axis of the circle on which it travels. I thereby secure a much-longer-lived roller for end-thrust bearings than by the use of spherical rollers, inasmuch as the contact or wearing surface is more widely distributed in the cylinder than in the ball.

The reason why the composite roller may roll freely around a circular plane is that each disk is free to rotate independent of the others. While one end of said roller moves faster (in order to travel over a greater diameter) than its opposite end, a torsional action the full length of roller is developed without resistance in the said roller. At the same time the rolling faces of said disks are all retained in perfect alinement in the form of a cylinder. In an end-thrust bearing a one-piece cylinder carrying a load could not twist; but most of its rolling surface would slide around the circle, thereby causing friction instead of alleviating it. As an example, in explaining more clearly my device, a two-inch ball has, for instance, considerably less than a one-sixteenth-of-an-inch bearing-surface on a level plane, which bearing-surface is not sufficient to support the load that size of ball should carry and give a reasonable amount of wear, yet it practically takes up the space of a cylinder two inches in diameter and two inches long. My composite roll shown in Fig. 2 if of the above size is composed of, for example, thirty-two of disks A one-sixteenth of an inch thick by two inches in diameter. They may be held together by rod B or held by other well-known means. The contact or wearing surface then is, approximately speaking, more than thirty-two times that of the two-inch ball, yet with each disk traveling independent of the others the said roller may be freely guided or rolled in a circular path on a level plane without sliding absolutely any of the thirty-two disks, while if the two-inch solid cylinder is guided on the same surface in a circle it will not only require force to guide same under a load, but there will be practically thirty-one thirty-seconds of the entire surface sliding. Consequently it is not practical. Therefore it will be seen the composite roller furnishes the greater contact-surface of the two-inch solid cylinder and carries nearly the same load and guides or rolls on any circular line of travel nearly as free as the ball and for the above reasons has a reasonably great advantage over either the ball or the solid cylinder.

I have found by practical tests and actual experiences many bearings where a series of disks held in the form of a roller are a great advantage for antifriction purposes.

Fig. 5 represents a roller-bearing, showing a side view of rollers E and D, a cross-section of Fig. 3 as said cage is applied in said bearing. E indicates one of the composite rollers, (the same as described and shown in Fig. 2,) which is located between the two coils I I and bears on the steel washers N N, which furnish hardened surface to the collar G of shaft F and to the outer casing H for the end thrust of the bearing. D indicates one of the usual one-piece cylindrical rollers, which is located between the two steel washers N N and bears on the spirally-wound wire casing on shaft F and the spirally-wound wire casing in the outer casing H. Said coils furnish a hardened surface for the cylindrical bearing. A series of each of said rollers follow each other alternately around the shaft in the same annular space. It will be seen the axis of one series is arranged at right angles to the axis of the other series. My object in using steel coils and steel washers is to supply an interchangeable hard bearing-surface easily applied to soft-metal shafting or boxing. If the steel coils should be slightly warped in tempering, they being flexible will readily conform to the surface of the shaft or outer casing when set in place. The inside of the coil on the shaft is preferably made a trifle smaller in diameter than the shaft, so it will fit snugly when in place. The coil in box is made a trifle larger than the opening in the box, so it will fit snugly when put in place. By the arrangement shown in Fig. 5 the advantages of reducing the end-thrust and cylindrical bearings to one line of travel, and one case of cylindrical rollers obviating the use of balls for end thrust, are apparent. It is also shown in Fig. 5 that the cage is supported by the rollers, and thereby prevented from rubbing against either the shafting or the casing. The cage Fig. 3, by the arrangement of two series of rollers E and D at right angles to each other, is supported free and clear from any and all parts of the bearing save the rollers themselves, which support it, and the endwise movement of the roller of either series is guided by the cylindrical sides or center rods of the other series through the medium of the cage. The cage may be varied in its outlines and construction; but I prefer the form shown in Fig. 3, which is made of two duplicate cases or halves joined together at line M and held together by rods B.

Deeming the above sufficient description, what I claim as my invention, and desire to secure by Letters Patent, is—

1. In a roller-bearing a series of disks assembled and retained in the form of a roller, a series of said rollers arranged with their axis radiating from a common center, and means for guiding said rollers relative to each other.

2. In a roller-bearing the combination of a series of the composite rollers arranged with their axis radiating from the axis of the shaft, and a series of the usual cylindrical rollers arranged parallel with the shaft and interposed alternately between the composite rollers in the same annular path around the shaft.

3. In a roller-bearing the combination of the shaft of an outer casing, two series of cylindrical rollers alternately with each other in an annular space around the shaft, the rollers of one series arranged parallel with the shaft, the rollers of the alternating series arranged with their axes radiating from the shaft, and means for guiding all the rollers around the shaft simultaneously, said rollers providing the vertical thrust and end thrust of the bearing, substantially as described.

4. In a roller-bearing the combination of a wedge-shaped ring, a spiral steel casing, the stationary annular wedge, and means for moving and retaining the wedge-shaped ring against the stationary wedge for the purpose described.

5. In a roller-bearing the combination of the outer casing and the rollers, the spirally-wound steel inner casing, the wedge-shaped ring, the nut for jamming the wedge-shaped ring against the wedge in the outer casing for the purpose of modifying the diameter of the inner casing.

6. In a roller-bearing the combination of the casing, the stationary annular wedge K, the movable wedge-shaped ring J, the nut L, the spirally-wound steel casing and the rollers all for the purpose described.

7. In a roller-bearing the combination of the composite rollers, composed of a series of disks, each disk rotating independent of the others, the steel washers for end-thrust bearings, and the usual cylindrical rollers, the shaft with the spirally-wound steel casing thereon, the outer casing with the spirally-wound steel casing therein for the cylindrical bearing.

In testimony that I claim the foregoing as my invention I affix my signature, in presence of two witnesses, this 27th day of July, A. D. 1900.

FRANK WHITNEY.

Witnesses:
M. K. MEYER,
ROBERT S. MOTH,